R. H. HENEMIER.
TIRE VALVE.
APPLICATION FILED NOV. 16, 1915.
1,367,815. Patented Feb. 8, 1921.
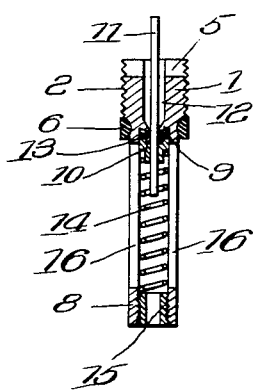
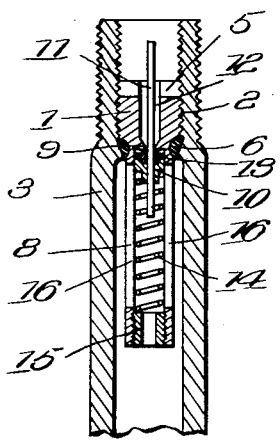
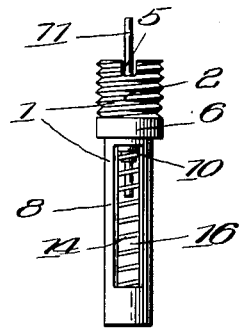
Inventor
Robert H. Henemier
By his Attorney

UNITED STATES PATENT OFFICE.

ROBERT H. HENEMIER, OF NEW YORK, N. Y., ASSIGNOR TO A. SCHRADER'S SON, INCORPORATED, OF BROOKLYN, NEW YORK, A CORPORATION OF NEW YORK.

TIRE-VALVE.

1,367,815.        Specification of Letters Patent.        Patented Feb. 8, 1921.

Original application filed July 23, 1914, Serial No. 852,567. Divided and this application filed November 16, 1915. Serial No. 61,788.

*To all whom it may concern:*

Be it known that I, ROBERT H. HENEMIER, a citizen of the United States, residing at New York city, in the county of New York and State of New York, have invented new and useful Improvements in Tire-Valves, of which the following is a specification.

My invention relates to valves for pneumatic tires and consists in an improved construction thereof of few and substantial parts which are economically made and which in use will have important advantages over the types of valves heretofore used and which will possess all features essential to a successful valve of this type.

A particular object of my invention is to produce a self contained inflating and deflating valve unit adapted to seal the stem by direct securing engagement therewith and having an integral, one piece inclosing casing adapted to afford protection to a yielding inflating and deflating valve element and operating spring therefor contained therein. The valve of my improved construction is adapted to permit rapid inflation and deflation of the tire and provides for accurately guiding the yielding valve element to its seat for effecting a tight closure of the stem. Moreover, my improved valve is removable as a rigid unit wherein the valve plunger and spring are protectively inclosed to insure against damage when removed and when being positioned in the stem and when in position for sealing the stem it permits of the pump connection being connected to the stem independently thereof.

The present application is a division of my former application Ser. No. 852,567, filed July 23, 1914, and patented Oct. 16, 1917, bearing Patent Number 1,243,521.

The described and other features and advantages of my invention will be understood by reference to the accompanying drawing wherein the reference numerals of this description are applied to like parts in the several views.

In the drawings Figure 1 illustrates the valve unit of my invention applied to a standard form of valve stem. Fig. 2 is a sectional view of my valve unit and Fig. 3 is a view thereof taken at right angles to Fig. 2.

As shown, the valve unit of my invention consists of the casing or socket member 1 having its upper portion exteriorly threaded at 2 to have threaded securing engagement with internal threads of a valve stem 3. This upper portion or head of the valve unit is provided with a transverse recess 5 to receive the edge of a screw driver or similar instrument. Surrounding the valve casing, immediately below the threaded upper portion, an annular packing washer 6 is positioned to engage a coacting seat of the stem so as to seal the stem when the valve unit is screwed therein.

The inner end of the valve unit is in the form of a tubular socket extension 8 formed by the casing integrally with threaded head portion and in the upper part of this tubular extension there is formed an inwardly directed shoulder or valve seat 9. Operating within this tubular extension as a guideway there is a valve plunger member 10 having an outwardly extended deflating pin 11 projected through the inflating bore 12 in the valve head portion. Upon the plunger member a suitable rubber washer 13 is positioned to coact with the valve seat 9 for tightly closing the inflating bore and normally to perform this function a suitable compression spring 14 is fitted within the tubular extension to bear upon the under surface of the plunger member 10; the spring for this purpose being confined between the member 10 and a lower supporting plug 15 threaded to the lower end of the extension and provided with a central bore. As shown, the tubular extension of the casing is provided at opposite sides with elongated slots or openings 16 which permit of the passage of the air around the valve plunger, the openings thus provided being of an area very much larger than in the ordinary valve to permit of rapid deflation and inflation.

In the operation of inflating the tire, the inflating device is connected to the valve stem 3 and the air pressure therefrom forces the yielding valve member 10 inwardly from its seat and the air passes through the head portion of the valve into the tubular extension and out through the slots 16 around the valve member 10 and back through the slots into the tubular extension and then through the bore of the plug 15 and stem into the tire. Upon depressing the deflating pin 11 the air may be exhausted.

It will be observed that I provide a tire-valve in which the valve shell has a screw-threaded end or nipple which is adapted for connection to a pump coupling, and a valve casing having its inner end fitting within the shell, the valve casing being of less diameter than the screw-threaded end or nipple of the valve shell so that it does not interfere with the application of such a pump coupling, and the valve casing having a packing adapted to make a tight joint between the valve casing and the shell, the valve casing having within it a seat and a valve proper, the valve proper being movable to and from the seat at all times so that the valve proper can act as a check valve. Preferably the valve casing extends entirely within the shell, but in any event, it should be so arranged that the pump coupling can screw on the valve shell instead of on the valve casing.

Having described my invention, I claim:

1. As a new article of manufacture, a self contained deflating valve unit comprising an integral casing member exteriorly threaded to have direct securing engagement with a valve stem, said casing being formed with an interior valve seat and having a tubular extension with side openings therein, a plunger within the casing, an exteriorly extending deflating pin connected to the plunger, a spring within the casing operative to force the plunger to its seat and a packing washer surrounding the casing for engaging the stem to form an air seal, said unit being adapted to be positioned wholly within the stem, substantially as described.

2. As a new article of manufacture a self contained deflating valve unit comprising an integral casing member exteriorly threaded to have direct securing engagement with a valve stem, said casing being formed with a valve seat in its interior, a plunger within said casing to coact with said seat, an exteriorly extending deflating pin connected to the plunger, a spring within the casing operative to force the plunger to its seat and a packing washer surrounding the casing for engaging the stem to form an air seal and said unit being adapted to be positioned wholly within the stem substantially as described.

3. As a new article of manufacture, a self contained deflating valve unit comprising an integral casing member exteriorly threaded to have direct securing engagement with a valve stem, said casing being formed with a valve seat and with a tubular extension provided with side openings, a plunger to co-act with the valve seat and fitted within the tubular extension, an exteriorly extending deflating pin connected to the plunger, a spring within the tubular extension operative to force the plunger to its seat and a packing washer surrounding the casing to engage the stem, said unit being adapted to be positioned wholly within the stem and said tubular extension being of reduced diameter to provide an annular passage for the air between the extension and the interior of the stem, substantially as described.

4. In a tire-valve or the like, the combination with a valve shell adapted to be connected with a tire tube, said valve shell having a screw-threaded nipple at its outer end adapted for connection to a pump coupling, and a valve casing having its inner end fitting within said shell, said valve casing being of less diameter throughout than the bore of said nipple, whereby it does not interfere with the application of such pump coupling, a packing adapted to make a tight joint between said valve casing and said shell, said valve casing having a valve chamber within it, a seat within said chamber, and a valve proper within said chamber, said valve proper at all times movable to and from said seat.

5. In a tire-valve or the like, the combination with a valve shell adapted to be connected with a tire tube, said valve shell having a screw-threaded nipple at its outer end adapted for connection to a pump coupling, and a valve casing having its inner end fitting within said shell, said valve casing being of less diameter throughout than the bore of said nipple, whereby it does not interfere with the application of such pump coupling, a packing carried by said valve casing adapted to make a tight joint between said valve casing and said shell, said valve casing having a valve chamber within it, a seat within said chamber, a valve proper within said chamber, and a spring within said valve chamber adapted to press said valve proper against its seat to close the same.

6. In a tire-valve or the like, the combination with a valve shell adapted to be connected with a tire tube, of a valve casing fitting entirely within said shell, whereby it does not interfere with the application of a pump coupling to said shell, a packing adapted to make a tight joint between said valve casing and said shell, said valve casing having a valve chamber within it, a seat within said chamber, and a valve proper within said chamber, said valve proper at all times movable to and from said seat.

7. In a tire-valve or the like, the combination with a valve shell adapted to be connected with a tire tube, of a valve casing fitting entirely within said shell, whereby it does not interfere with the application of a pump coupling to said shell, a packing adapted to make a tight joint between said valve casing and said shell, said valve casing having a valve chamber within it, a seat within said chamber, a valve proper within said chamber, said valve proper at all times movable to and from said seat and a spring within said valve chamber adapted to press said valve proper against its seat to close the same.

In testimony whereof I have signed my name to this specification.

ROBERT H. HENEMIER.